US011633848B2

(12) United States Patent
Morey

(10) Patent No.: US 11,633,848 B2
(45) Date of Patent: Apr. 25, 2023

(54) INDEPENDENT PAN OF COAXIAL ROBOTIC ARM AND PERCEPTION HOUSING

(71) Applicant: X Development LLC, Mountain View, CA (US)

(72) Inventor: Christopher Morey, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 878 days.

(21) Appl. No.: 16/527,076

(22) Filed: Jul. 31, 2019

(65) Prior Publication Data

US 2021/0031361 A1   Feb. 4, 2021

(51) Int. Cl.
| | |
|---|---|
| *B25J 9/10* | (2006.01) |
| *B25J 19/00* | (2006.01) |
| *B25J 19/02* | (2006.01) |
| *F16H 1/28* | (2006.01) |
| *B25J 5/00* | (2006.01) |

(52) U.S. Cl.
CPC ........... *B25J 9/102* (2013.01); *B25J 19/0029* (2013.01); *B25J 19/027* (2013.01); *F16H 1/28* (2013.01); *B25J 5/005* (2013.01); *B25J 5/007* (2013.01)

(58) Field of Classification Search
CPC ......... F16H 1/28; B25J 9/102; B25J 19/0029; B25J 19/027; B25J 5/005; B25J 5/007
See application file for complete search history.

(56) References Cited

U.S. PATENT DOCUMENTS

| | | |
|---|---|---|
| 1,480,623 A | 1/1924 | Liebmann |
| RE23,166 E | 11/1949 | Owen |
| 3,148,791 A | 9/1964 | Kampert et al. |
| 3,254,781 A | 6/1966 | Zink |
| 3,356,240 A | 12/1967 | Zink |
| 3,369,679 A | 2/1968 | Robinson |

(Continued)

FOREIGN PATENT DOCUMENTS

| | | | |
|---|---|---|---|
| CA | 2988228 A1 * | 6/2018 | ............. B25J 17/00 |
| EP | 0232930 | 8/1987 | |

(Continued)

OTHER PUBLICATIONS

International Searching Authority, International Search Report and Written Opinion dated Oct. 26, 2020, issued in connection with International Patent Application No. PCT/US2020/037013, filed on Jun. 10, 2020, 17 pages.

(Continued)

*Primary Examiner* — Zakaria Elahmadi
(74) *Attorney, Agent, or Firm* — McDonnell Boehnen Hulbert & Berghoff LLP

(57) ABSTRACT

A robotic device may include a spine defining a yaw axis. The robotic device may also include an arm joint rotatably connected to the spine at a first position along the yaw axis and configured to rotate about the yaw axis. The robotic device may further include an actuator including a ring that defines a bore. The spine may be fixedly connected to the ring at a second position along the yaw axis and may extend through the bore. The actuator may be connected to the arm joint and configured to rotate the arm joint about the yaw axis without rotating the spine.

20 Claims, 12 Drawing Sheets

(56) References Cited

U.S. PATENT DOCUMENTS

| | | | |
|---|---|---|---|
| 4,283,165 A | 8/1981 | Vertut | |
| 4,864,888 A * | 9/1989 | Iwata | B25J 17/0241 |
| | | | 901/23 |
| 4,865,514 A | 9/1989 | Tsuchihashi et al. | |
| 4,874,286 A * | 10/1989 | Koster | B25J 9/107 |
| | | | 414/744.5 |
| RE34,292 E | 6/1993 | Bingman et al. | |
| 5,807,056 A | 9/1998 | Osborn et al. | |
| 5,893,794 A | 4/1999 | Togawa et al. | |
| 6,203,582 B1 | 3/2001 | Berner et al. | |
| 6,266,901 B1 | 7/2001 | Kanda et al. | |
| 6,327,517 B1 | 12/2001 | Sundar | |
| 6,394,740 B1 | 5/2002 | Derby et al. | |
| 6,656,017 B2 | 12/2003 | Jackson | |
| 7,346,428 B1 | 3/2008 | Huffman et al. | |
| 7,836,811 B1 | 11/2010 | Gardner et al. | |
| 8,221,049 B1 | 7/2012 | Westendorf et al. | |
| 8,496,077 B2 * | 7/2013 | Nesnas | B62D 21/04 |
| | | | 180/21 |
| 8,857,012 B2 | 10/2014 | Kim et al. | |
| 8,892,253 B2 | 11/2014 | Park et al. | |
| 8,958,911 B2 | 2/2015 | Wong et al. | |
| 9,230,841 B2 | 1/2016 | Gilchrist et al. | |
| 9,662,525 B2 | 5/2017 | Lee et al. | |
| 9,665,095 B1 | 5/2017 | Romano et al. | |
| 9,682,483 B1 | 6/2017 | Romano et al. | |
| 2005/0095096 A1 | 5/2005 | Curotto et al. | |
| 2005/0166413 A1 | 8/2005 | Crampton | |
| 2006/0021408 A1 | 2/2006 | Hammar et al. | |
| 2006/0212168 A1 | 9/2006 | Baba et al. | |
| 2006/0228205 A1 | 10/2006 | Trachet et al. | |
| 2006/0242775 A1 | 11/2006 | Ho | |
| 2006/0283611 A1 | 12/2006 | Wittkowski | |
| 2007/0048115 A1 | 3/2007 | Fenelli et al. | |
| 2007/0080000 A1 * | 4/2007 | Tobey | A61G 5/045 |
| | | | 180/21 |
| 2007/0089260 A1 | 4/2007 | Shinler et al. | |
| 2007/0239315 A1 | 10/2007 | Sato et al. | |
| 2009/0170417 A1 | 7/2009 | Janssen et al. | |
| 2010/0243344 A1 | 9/2010 | Wyrobek et al. | |
| 2010/0261411 A1 | 10/2010 | Reinmoeller et al. | |
| 2010/0292841 A1 | 11/2010 | Wickham | |
| 2011/0202175 A1 | 8/2011 | Romanov et al. | |
| 2011/0238205 A1 | 9/2011 | Kemp et al. | |
| 2012/0061155 A1 * | 3/2012 | Berger | B25J 19/0016 |
| | | | 180/21 |
| 2012/0152877 A1 | 6/2012 | Tadayon | |
| 2012/0215358 A1 * | 8/2012 | Gettings | B25J 19/023 |
| | | | 294/213 |
| 2013/0226341 A1 | 8/2013 | Sturm | |
| 2013/0247829 A1 | 9/2013 | Taneja et al. | |
| 2014/0031977 A1 | 1/2014 | Goldenberg et al. | |
| 2014/0144470 A1 | 5/2014 | Sewell et al. | |
| 2014/0311271 A1 | 10/2014 | Cao et al. | |
| 2014/0316308 A1 | 10/2014 | Lee et al. | |
| 2014/0360305 A1 | 12/2014 | Olds et al. | |
| 2015/0088300 A1 | 3/2015 | Kilibarda et al. | |
| 2015/0104283 A1 | 4/2015 | Nogami et al. | |
| 2015/0226369 A1 | 8/2015 | Troy et al. | |
| 2015/0336264 A1 | 11/2015 | Berger et al. | |
| 2016/0096653 A1 | 4/2016 | Stratton et al. | |
| 2016/0167227 A1 | 6/2016 | Wellman et al. | |
| 2016/0199985 A1 | 7/2016 | Ganninger | |
| 2016/0260161 A1 | 9/2016 | Atchley et al. | |
| 2017/0023947 A1 | 1/2017 | McMillion | |
| 2017/0144309 A1 | 5/2017 | Sankai | |
| 2017/0148075 A1 | 5/2017 | High et al. | |
| 2017/0178066 A1 | 6/2017 | High et al. | |
| 2017/0237314 A1 * | 8/2017 | Moore | F16H 1/28 |
| | | | 475/149 |
| 2018/0133905 A1 * | 5/2018 | Smith | B25J 17/0241 |

FOREIGN PATENT DOCUMENTS

| | | |
|---|---|---|
| JP | 2009279663 | 12/2009 |
| WO | WO2009074704 A1 | 6/2009 |

OTHER PUBLICATIONS

Rethink Robotics: "Intera 5—User Guide/Getting Started—Original Instructions," Jun. 18, 2018, retrieved from the internet: URL:https://static1.squarespace.com/static/5c61e658fb18202eaf7f97cf/t5c780f239b747a716142e542/1551372075210/Intera+5_3+User+Guide_Getting+Started+20180618_RevA.pdf [retrieved on Jul. 30, 2020], 217 pages.

Mark Prigg, "Google's terrifying two legged giant robot taught how to clean: Researchers reveal Ian the Atlas Robot can now vacuum, sweep and even put the trash away," DailyMail.com, Jan. 16, 2016.

Smart End Effectors For Robotic Assembly (Abstract), Assembly Engineering, vol. 30, issue 8, Aug. 1987.

* cited by examiner

INDEPENDENT PAN OF COAXIAL ROBOTIC ARM AND PERCEPTION HOUSING

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

A robotic device may include a spine that provides for mounting thereto of a plurality of components of the robotic device. In some implementations, these components may each be coaxial or approximately coaxial, and some may be rotationally connected to the spine. For example, an arm joint of a robotic arm may be connected at a first point along the spine and another appendage, such as a mast, a perception housing, or another robotic arm, may be connected to an adapter at another point along the spine. The arm joint may be configured to rotate about the spine and may be actuated by way of an actuator that defines a bore through which the spine extends, thus accommodating the spine structure. The actuator may include a housing fixedly connected to the spine, and a hub rotationally connected to the housing and fixedly connected to the arm joint. By connecting the robotic components at different points along the spine, each component may be able to move independently of the other components while at the same time allowing these components to be serially stacked to generate a desired robotic structure.

In a first example embodiment, a robotic device is provided that includes a spine defining a yaw axis. The robotic device also includes an arm joint rotatably connected to the spine at a first position along the yaw axis and configured to rotate about the yaw axis. The robotic device further includes an actuator comprising a ring that defines a bore. The spine is fixedly connected to the ring at a second position along the yaw axis and extends through the bore. The actuator is connected to the arm joint and configured to rotate the arm joint about the yaw axis without rotating the spine.

In a second example embodiment, an actuator is provided that includes a motor and a gear train connecting the motor to an output gear. The actuator also includes a hub defining a bore and having a ring gear disposed around a portion thereof. The hub is fixedly connectable to a joint. The bore provides clearance for extension therethrough of a spine having a yaw axis around which the joint is configured to rotate. The actuator additionally includes a housing concentric with, rotatably coupled to, and surrounding the hub. The housing is fixedly connectable to the spine. The actuator further includes an annular plate fixedly connecting the gear train to the housing such that the output gear meshes with the ring gear to rotate the hub relative to the housing.

In a third example embodiment, a method is provided that includes causing an actuator connected to an arm joint of a robotic device to rotate the arm joint about a yaw axis of a spine of the robotic device. The arm joint may be rotatably connected to the spine at a first position along the yaw axis. The actuator may include a ring that defines a bore. The spine may be fixedly connected to the ring at a second position along the yaw axis and may extend through the bore. While the actuator rotates the arm joint about the yaw axis, the spine and an adapter connected to a first end of the spine may be maintained at a constant rotational position with respect to a base to which a second end of the spine is connected. The method may also include causing rotation of an appendage connected to the adapter. The rotation may be relative to the adapter and independent of rotation of the arm joint about the yaw axis.

In a fourth example embodiment, a non-transitory computer readable storage medium is provided including instructions that, when executed by a computing device, cause the computing device to perform operations. The operations include causing an actuator connected to an arm joint of a robotic device to rotate the arm joint about a yaw axis of a spine of the robotic device. The arm joint may be rotatably connected to the spine at a first position along the yaw axis. The actuator may include a ring that defines a bore. The spine may be fixedly connected to the ring at a second position along the yaw axis and may extend through the bore. While the actuator rotates the arm joint about the yaw axis, the spine and an adapter connected to a first end of the spine may be maintained at a constant rotational position with respect to a base to which a second end of the spine is connected. The operations may also include causing rotation of an appendage connected to the adapter. The rotation may be relative to the adapter and independent of rotation of the arm joint about the yaw axis.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
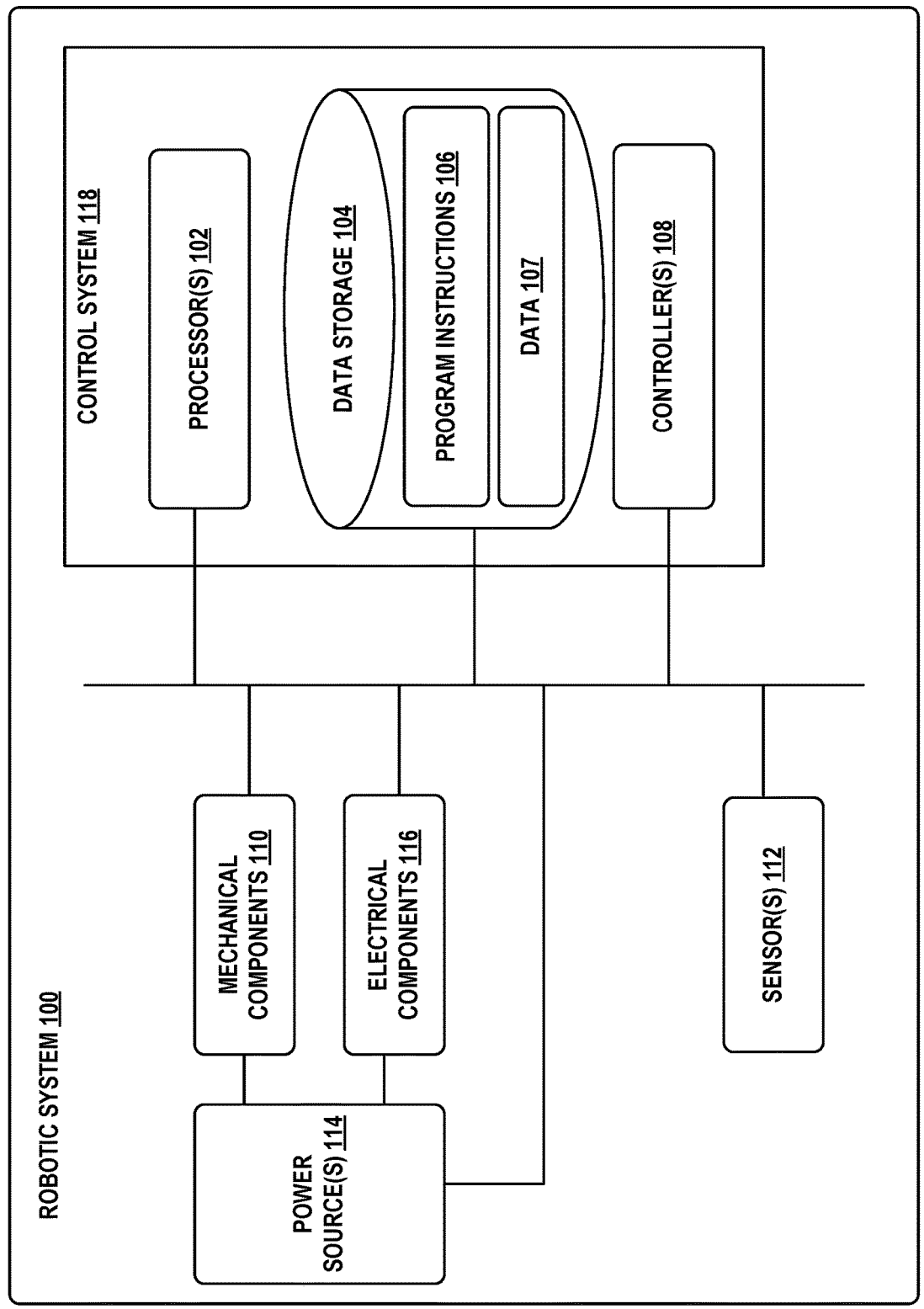
FIG. 1 illustrates a configuration of a robotic system, in accordance with example embodiments.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. Overview

Some robotic devices may include components that are stacked or connected in a coaxial or approximately coaxial manner. Such stacking may allow each component to be placed at a desired distance relative to other components of the robotic device or relative to expected heights of objects within the environment. In one example, a robotic device may include a mobile base, a mounting column connected to the mobile base, a rotational joint (e.g., for an arm of the robotic device), a mast connected to the rotational joint, and a perception housing connected to the mast. The mounting column, a rotational arm joint, mast, and perception housing may each be stacked on top of one another and, in some cases, may each be coaxial. Such stacking may allow the arm joint to maintain the arm at a height that allows for both low-down and high-up objects to be grasped, while allowing sensors on the mast and/or perception housing to have a wide area of view of the environment.

Because these components are stacked, however, motion of one component may induce commensurate motion in some of the other components. For example, rotation of the arm joint may result in proportional rotation of the mast and/or perception housing, since these are serially and structurally connected to the top of the rotational joint rather than being independently connected to the base of the robotic device. Accordingly, rotating a first component may necessitate a proportional counter-rotation in one or more other components. Thus, simultaneous rotation of multiple components in respective desired direction may involve complicated combination of rotations and counter-rotations to achieve the desired motion. This may, in turn, necessitate additional hardware and/or computational complexity, resulting in a robotic device that is more expensive, less responsive, uses more power, and has additional possible points of failure.

Accordingly, examples provided herein include a structural architecture that allows for independent rotation of multiple stacked robotic components. Specifically, the architecture provides a spine that may be fixedly connected to the base of the robotic device and extends through one or more of the stacked components of the robotic device. The stacked components may be connected directly to the spine, rather than being serially connected to one another, and these components may therefore rotate about the spine, or remain stationary with respect thereto, independently of one another. Further, the spine may be manufactured from a stronger material (e.g., metal) than other components of the robotic device (e.g., molded plastic), thus providing more stability than the serial connection of individual components.

In one example, the spine may extend through the mounting column and the rotational joint and provide at a first end thereof an adapter for connecting to the mast, the perception housing, and/or another appendage. The arm joint may be rotationally connected to the spine and configured to rotate without causing commensurate rotation of the spine, mast, perception housing, and/or other component connected to the spine. That is, the spine may remain in a rotationally constant position with respect to its base, thus providing a fixed structure relative to which different components may be connected and/or move independently. The mast and/or perception housing may be connected to an adapter plate at a top end of the spine. In some implementations, the spine may extend through multiple rotational joints. For example, the robotic device may include, in stacked order, a mounting column, a first rotational joint, a spacer, a second rotational joint, and the adapter for the mast, perception housing, or some other appendage (e.g., another arm).

In order to accommodate the spine, the rotational joint may be actuated by an actuator designed to coordinate with this robotic architecture. Namely, the actuator may include a hub and a housing that is concentric with and rotationally connected to the hub. The hub may define a bore large enough to allow the spine to extend therethrough. Similarly, the housing may define a second bore large enough to house the hub. The housing may be fixedly connectable to the spine, while the hub may be fixedly connectable to the rotational joint. Thus, since the hub and housing are rotationally connected, connecting the rotational joint to the spine by way of the actuator creates an actuated rotational connection between the spine and the rotational joint.

The actuator may be driven by a motor connected to the housing by way of a gear train and one or more adapters. An output gear of the gear train may be positioned to mesh with a ring gear disposed around a portion of the hub, thus allowing the motor to cause rotation of the hub relative to the housing. The motor and the gear train may be stacked together and, when connected to the housing, this motor assembly may be positioned along a circumference of the housing, rather than near a center thereof, to provide clearance from the spine. The rotational axes of the motor and the gear train may thus be parallel to a yaw axis defined by the spine.

The spine may include a hollow core and one or more holes along the spine that provide access to the hollow core. The hollow core may be used to route wires to various components along the spine. For example, power and signal wires may be routed from a hole near a bottom end of the spine, through the hollow core, to a position proximate to the actuator to allow these wires to connect to the actuator. Similarly, power and signal wires may be routed from the hole near the bottom, through the hollow core, to a position near a top end of the spine to allow these wires to connect to the rotational joint (e.g., sensors and motors in the robotic arm connected to this joint) and/or components connected to the adapter (e.g., mast, perception housing, sensors thereon, etc.).

Notably, the electrical connection with the rotational joint may be provided by way of a clock spring. The clock spring may include wires that wind and unwind as the rotational joint rotates. In some implementations, one or more slip rings may be used instead of the clock spring, thus allowing the arm joint to rotate without any limits imposed by the length of wire available in the clock spring. Notably, however, the clock spring may provide for higher signal integrity and less noise, as it provides a constant electrical connection that does not rely on brushes like the slip ring.

II. Example Robotic Systems

FIG. 1 illustrates an example configuration of a robotic system that may be used in connection with the implementations described herein. Robotic system 100 may be configured to operate autonomously, semi-autonomously, or using directions provided by user(s). Robotic system 100 may be implemented in various forms, such as a robotic arm, industrial robot, or some other arrangement. Some example implementations involve a robotic system 100 engineered to be low cost at scale and designed to support a variety of tasks. Robotic system 100 may be designed to be capable of operating around people. Robotic system 100 may also be optimized for machine learning. Throughout this description, robotic system 100 may also be referred to as a robot, robotic device, or mobile robot, among other designations.

As shown in FIG. 1, robotic system 100 may include processor(s) 102, data storage 104, and controller(s) 108, which together may be part of control system 118. Robotic system 100 may also include sensor(s) 112, power source(s) 114, mechanical components 110, and electrical components 116. Nonetheless, robotic system 100 is shown for illustrative purposes, and may include more or fewer components. The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106, and manipulate data 107, both of which are stored in data storage 104. Processor(s) 102 may also directly or indirectly interact with other components of robotic system 100, such as sensor(s) 112, power source(s) 114, mechanical components 110, or electrical components 116.

Data storage 104 may be one or more types of hardware memory. For example, data storage 104 may include or take the form of one or more computer-readable storage media that can be read or accessed by processor(s) 102. The one or more computer-readable storage media can include volatile or non-volatile storage components, such as optical, magnetic, organic, or another type of memory or storage, which can be integrated in whole or in part with processor(s) 102. In some implementations, data storage 104 can be a single physical device. In other implementations, data storage 104 can be implemented using two or more physical devices, which may communicate with one another via wired or wireless communication. As noted previously, data storage 104 may include the computer-readable program instructions 106 and data 107. Data 107 may be any type of data, such as configuration data, sensor data, or diagnostic data, among other possibilities.

Controller 108 may include one or more electrical circuits, units of digital logic, computer chips, or microprocessors that are configured to (perhaps among other tasks), interface between any combination of mechanical components 110, sensor(s) 112, power source(s) 114, electrical components 116, control system 118, or a user of robotic system 100. In some implementations, controller 108 may be a purpose-built embedded device for performing specific operations with one or more subsystems of the robotic system 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. In some instances, control system 118 may include various components for communicating with robotic system 100, including a joystick, buttons, or ports, etc. The example interfaces and communications noted above may be implemented via a wired or wireless connection, or both. Control system 118 may perform other operations for robotic system 100 as well.

During operation, control system 118 may communicate with other systems of robotic system 100 via wired or wireless connections, and may further be configured to communicate with one or more users of the robot. As one possible illustration, control system 118 may receive an input (e.g., from a user or from another robot) indicating an instruction to perform a requested task, such as to pick up and move an object from one location to another location. Based on this input, control system 118 may perform operations to cause the robotic system 100 to make a sequence of movements to perform the requested task. As another illustration, a control system may receive an input indicating an instruction to move to a requested location. In response, control system 118 (perhaps with the assistance of other components or systems) may determine a direction and speed to move robotic system 100 through an environment en route to the requested location.

Operations of control system 118 may be carried out by processor(s) 102. Alternatively, these operations may be carried out by controller(s) 108, or a combination of processor(s) 102 and controller(s) 108. In some implementations, control system 118 may partially or wholly reside on a device other than robotic system 100, and therefore may at least in part control robotic system 100 remotely.

Mechanical components 110 represent hardware of robotic system 100 that may enable robotic system 100 to perform physical operations. As a few examples, robotic system 100 may include one or more physical members, such as an arm, an end effector, a head, a neck, a torso, a base, and wheels. The physical members or other parts of robotic system 100 may further include actuators arranged to move the physical members in relation to one another. Robotic system 100 may also include one or more structured bodies for housing control system 118 or other components, and may further include other types of mechanical components. The particular mechanical components 110 used in a given robot may vary based on the design of the robot, and may also be based on the operations or tasks the robot may be configured to perform.

In some examples, mechanical components 110 may include one or more removable components. Robotic system 100 may be configured to add or remove such removable components, which may involve assistance from a user or another robot. For example, robotic system 100 may be configured with removable end effectors or digits that can be replaced or changed as needed or desired. In some implementations, robotic system 100 may include one or more removable or replaceable battery units, control systems, power systems, bumpers, or sensors. Other types of removable components may be included within some implementations.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, or cameras, among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment or location of nearby objects, which may assist with environment recognition and navigation.

In some examples, sensor(s) 112 may include RADAR (e.g., for long-range object detection, distance determination, or speed determination), LIDAR (e.g., for short-range object detection, distance determination, or speed determination), SONAR (e.g., for underwater object detection, distance determination, or speed determination), VICON® (e.g., for motion capture), one or more cameras (e.g., stereoscopic cameras for 3D vision), a global positioning system (GPS) transceiver, or other sensors for capturing information of the environment in which robotic system 100 is operating. Sensor(s) 112 may monitor the environment in real time, and detect obstacles, elements of the terrain, weather conditions, temperature, or other aspects of the environment. In another example, sensor(s) 112 may capture data corresponding to one or more characteristics of a target or identified object, such as a size, shape, profile, structure, or orientation of the object.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such as the operation of an extendable arm, an end effector, or other mechanical or electrical features of robotic system 100. The data provided by sensor(s) 112 may enable control system 118 to determine errors in operation as well as monitor overall operation of components of robotic system 100.

As an example, robotic system 100 may use force/torque sensors to measure load on various components of robotic system 100. In some implementations, robotic system 100 may include one or more force/torque sensors on an arm or end effector to measure the load on the actuators that move one or more members of the arm or end effector. In some examples, the robotic system 100 may include a force/torque sensor at or near the wrist or end effector, but not at or near other joints of a robotic arm. In further examples, robotic system 100 may use one or more position sensors to sense the position of the actuators of the robotic system. For instance, such position sensors may sense states of extension, retraction, positioning, or rotation of the actuators on an arm or end effector.

As another example, sensor(s) 112 may include one or more velocity or acceleration sensors. For instance, sensor(s) 112 may include an inertial measurement unit (IMU). The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicitly discussed herein. Additionally or alternatively, the robotic system may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Components of robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of robotic system 100. Power source(s) 114 may charge using various types of charging, such as wired connections to an outside power source, wireless charging, combustion, or other examples.

Electrical components 116 may include various mechanisms capable of processing, transferring, or providing electrical charge or electric signals. Among possible examples, electrical components 116 may include electrical wires, circuitry, or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to the various mechanical components 110, for example. Further, robotic system 100 may include electric motors. Other examples of electrical components 116 may exist as well.

Robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to operate in tight spaces may have a relatively tall, narrow body. Further, the body or the other components may be developed using various types of materials, such as metals or plastics. Within other examples, a robot may have a body with a different structure or made of various types of materials.

The body or the other components may include or carry sensor(s) 112. These sensors may be positioned in various locations on the robotic system 100, such as on a body, a head, a neck, a base, a torso, an arm, or an end effector, among other examples.

Robotic system 100 may be configured to carry a load, such as a type of cargo that is to be transported. In some examples, the load may be placed by the robotic system 100 into a bin or other container attached to the robotic system 100. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, robotic system 100 may include various types of appendages, wheels, end effectors, gripping devices and so on. In some examples, robotic system 100 may include a mobile base with wheels, treads, or some other form of locomotion. Additionally, robotic system 100 may include a robotic arm or some other form of robotic manipulator. In the case of a mobile base, the base may be considered as one of mechanical components 110 and may include wheels, powered by one or more of actuators, which allow for mobility of a robotic arm in addition to the rest of the body.

Figure 2:
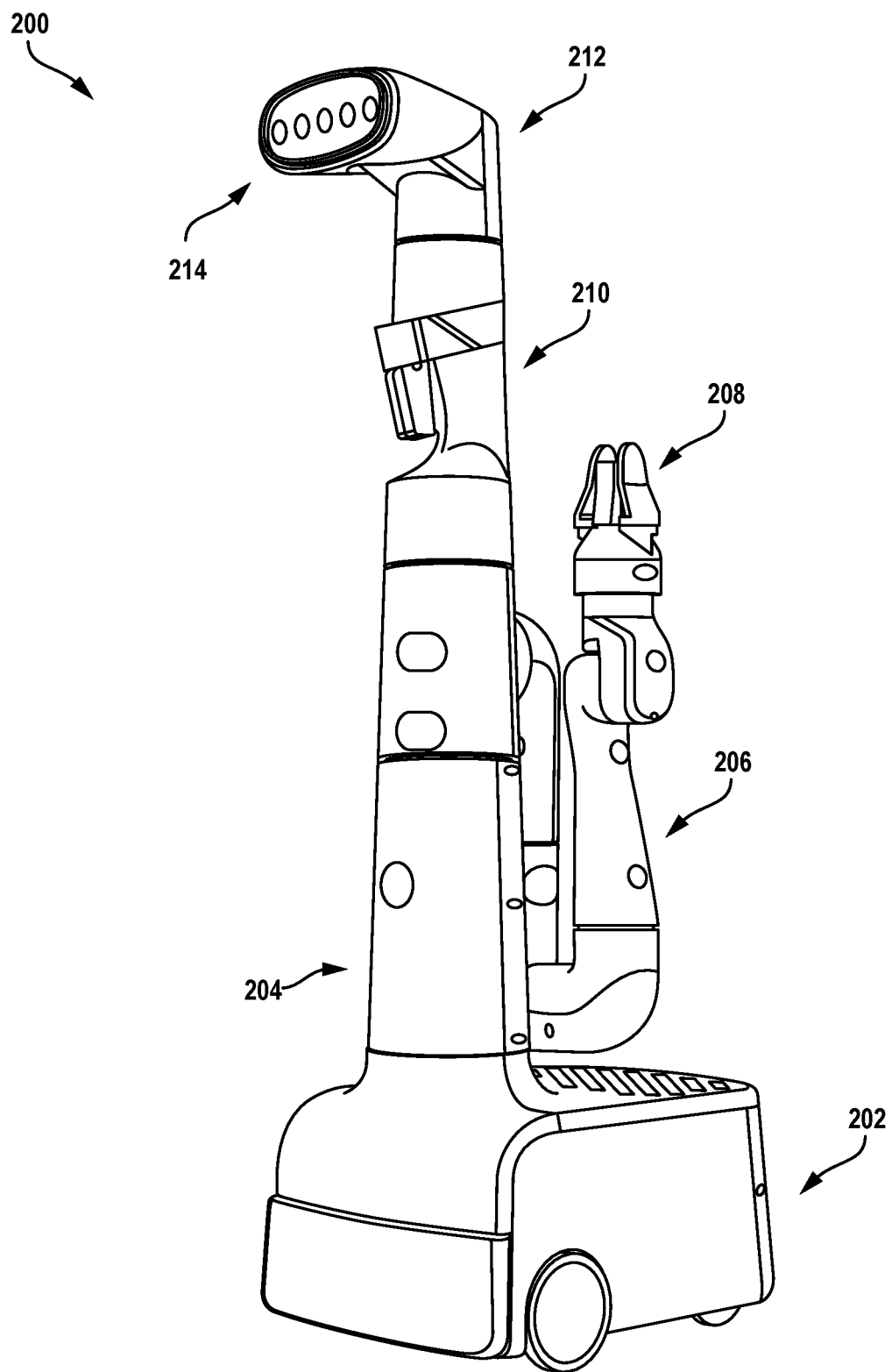
FIG. 2 illustrates a mobile robot, in accordance with example embodiments.
Figure 3:
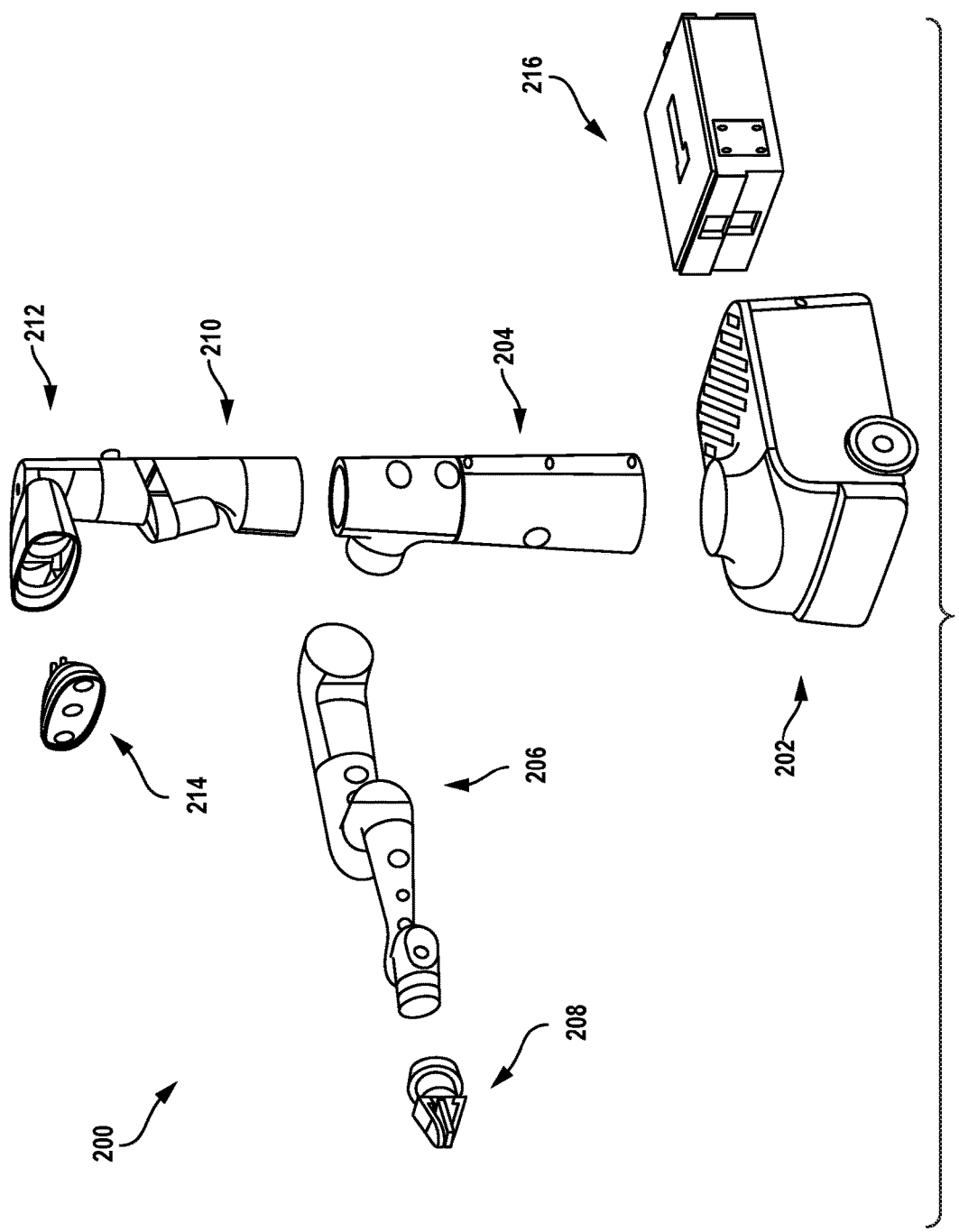
FIG. 3 illustrates an exploded view of a mobile robot, in accordance with example embodiments.

FIG. 2 illustrates a mobile robot, in accordance with example embodiments. FIG. 3 illustrates an exploded view of the mobile robot, in accordance with example embodiments. More specifically, robot 200 may include mobile base 202, midsection 204, arm 206, end-of-arm system (EOAS) 208, mast 210, perception housing 212, and perception suite 214. Robot 200 may also include compute box 216 stored within mobile base 202.

Mobile base 202 includes two drive wheels positioned at a front end of the robot 200 in order to provide locomotion to robot 200. Mobile base 202 also includes additional casters (not shown) to facilitate motion of mobile base 202 over a ground surface. Mobile base 202 may have a modular architecture that allows compute box 216 to be easily removed. Compute box 216 may serve as a removable control system for robot 200 (rather than a mechanically integrated control system). After removing external shells, compute box 216 can be easily removed and/or replaced. Mobile base 202 may also be designed to allow for additional modularity. For example, mobile base 202 may also be designed so that a power system, a battery, and/or external bumpers can all be easily removed and/or replaced.

Midsection 204 may be attached to mobile base 202 at a front end of mobile base 202. Midsection 204 includes a mounting column which is fixed to mobile base 202. Midsection 204 additionally includes a rotational joint for arm 206. More specifically, midsection 204 includes the first two degrees of freedom for arm 206 (a shoulder yaw J0 joint and a shoulder pitch J1 joint). The mounting column and the shoulder yaw J0 joint may form a portion of a stacked tower at the front of mobile base 202. The mounting column and the shoulder yaw J0 joint may be coaxial. The length of the mounting column of midsection 204 may be chosen to provide arm 206 with sufficient height to perform manipulation tasks at commonly encountered height levels (e.g., coffee table top level and/or counter top level). The length of the mounting column of midsection 204 may also allow the shoulder pitch J1 joint to rotate arm 206 over mobile base 202 without contacting mobile base 202.

Arm 206 may be a 7DOF robotic arm when connected to midsection 204. As noted, the first two DOFs of arm 206 may be included in midsection 204. The remaining five DOFs may be included in a standalone section of arm 206 as illustrated in FIGS. 2 and 3. Arm 206 may be made up of plastic monolithic link structures. Inside arm 206 may be housed standalone actuator modules, local motor drivers, and thru bore cabling.

EOAS 208 may be an end effector at the end of arm 206. EOAS 208 may allow robot 200 to manipulate objects in the environment. As shown in FIGS. 2 and 3, EOAS 208 may be a gripper, such as an underactuated pinch gripper. The gripper may include one or more contact sensors such as force/torque sensors and/or non-contact sensors such as one or more cameras to facilitate object detection and gripper control. EOAS 208 may also be a different type of gripper such as a suction gripper or a different type of tool such as a drill or a brush. EOAS 208 may also be swappable or include swappable components such as gripper digits.

Mast 210 may be a relatively long, narrow component between the shoulder yaw J0 joint for arm 206 and perception housing 212. Mast 210 may be part of the stacked tower at the front of mobile base 202. Mast 210 may be fixed relative to mobile base 202. Mast 210 may be coaxial with midsection 204. The length of mast 210 may facilitate perception by perception suite 214 of objects being manipulated by EOAS 208. Mast 210 may have a length such that when the shoulder pitch J1 joint is rotated vertical up, a topmost point of a bicep of arm 206 is approximately aligned with a top of mast 210. The length of mast 210 may then be sufficient to prevent a collision between perception housing 212 and arm 206 when the shoulder pitch J1 joint is rotated vertical up.

As shown in FIGS. 2 and 3, mast 210 may include a light detection and ranging (lidar) sensor. The lidar sensor may be configured to collect depth information about the environment. The lidar sensor may be coupled to a carved-out portion of mast 210 and fixed at a downward angle. The lidar position may be optimized for localization, navigation, and for front cliff detection.

Perception housing 212 may include at least one sensor making up perception suite 214. Perception housing 212 may be connected to a pan/tilt control to allow for reorienting of perception housing 212 (e.g., to view objects being manipulated by EOAS 208). Perception housing 212 may be a part of the stacked tower fixed to mobile base 202. A rear portion of perception housing 212 may be coaxial with mast 210.

Perception suite 214 may include a suite of sensors configured to collect sensor data representative of the environment of robot 200. Perception suite 214 may include an infrared (IR)-assisted stereo depth sensor. Perception suite 214 may additionally include a wide-angled red-green-blue (RGB) camera for human-robot interaction and context information. Perception suite 214 may additionally include a high resolution RGB camera for object classification. A face light ring surrounding perception housing 212 may also be included for improved human-robot interaction and scene illumination.

Figure 4:
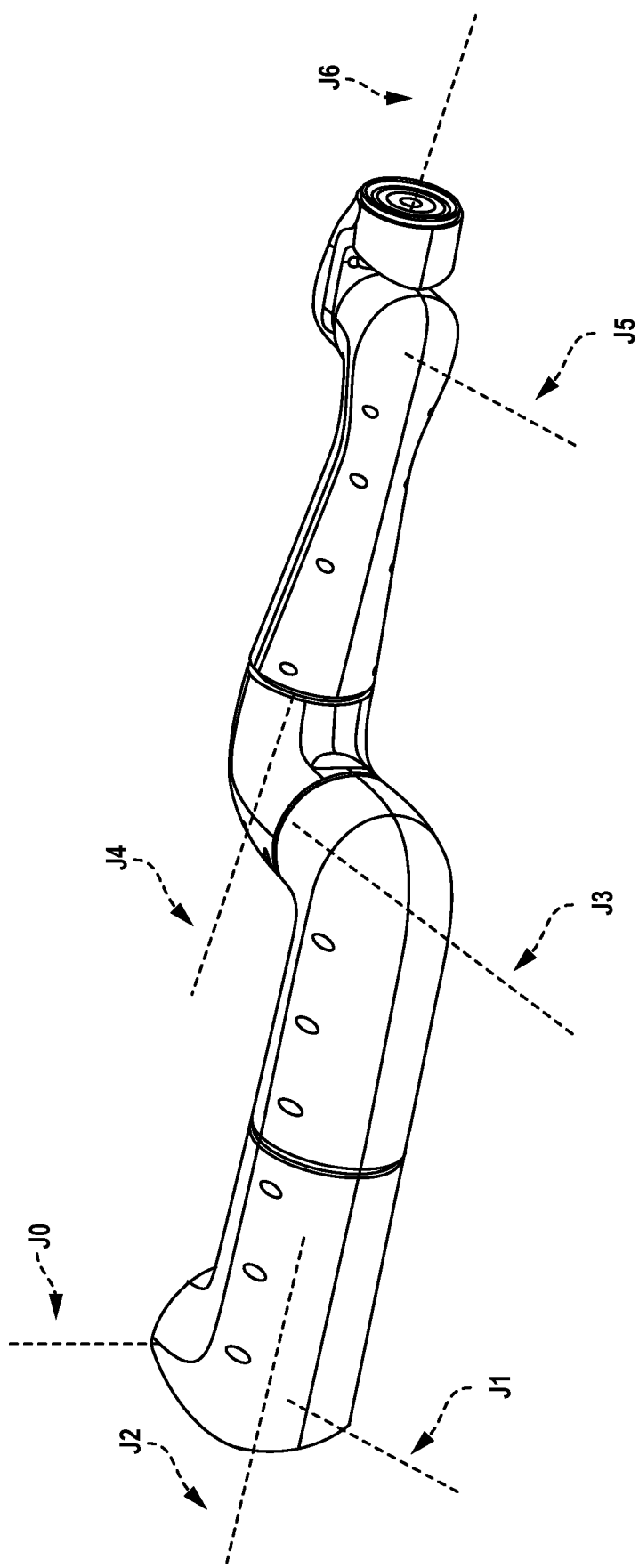
FIG. 4 illustrates a robotic arm, in accordance with example embodiments.

FIG. 4 illustrates a robotic arm, in accordance with example embodiments. The robotic arm includes 7 DOFs: a shoulder yaw J0 joint, a shoulder pitch J1 joint, a bicep roll J2 joint, an elbow pitch J3 joint, a forearm roll J4 joint, a wrist pitch J5 joint, and wrist roll J6 joint. Each of the joints may be coupled to one or more actuators. The actuators coupled to the joints may be operable to cause movement of links down the kinematic chain (as well as any end effector attached to the robot arm).

The shoulder yaw J0 joint allows the robot arm to rotate toward the front and toward the back of the robot. One beneficial use of this motion is to allow the robot to pick up an object in front of the robot and quickly place the object on the rear section of the robot (as well as the reverse motion). Another beneficial use of this motion is to quickly move the robot arm from a stowed configuration behind the robot to an active position in front of the robot (as well as the reverse motion).

The shoulder pitch J1 joint allows the robot to lift the robot arm (e.g., so that the bicep is up to perception suite level on the robot) and to lower the robot arm (e.g., so that the bicep is just above the mobile base). This motion is beneficial to allow the robot to efficiently perform manipulation operations (e.g., top grasps and side grasps) at different target height levels in the environment. For instance, the shoulder pitch J1 joint may be rotated to a vertical up position to allow the robot to easily manipulate objects on a table in the environment. The shoulder pitch J1 joint may be rotated to a vertical down position to allow the robot to easily manipulate objects on a ground surface in the environment.

The bicep roll J2 joint allows the robot to rotate the bicep to move the elbow and forearm relative to the bicep. This motion may be particularly beneficial for facilitating a clear view of the EOAS by the robot's perception suite in the perception housing. By rotating the bicep roll J2 joint, the robot may kick out the elbow and forearm to improve line of sight to an object held in a gripper of the robot.

Moving down the kinematic chain, alternating pitch and roll joints (a shoulder pitch J1 joint, a bicep roll J2 joint, an elbow pitch J3 joint, a forearm roll J4 joint, a wrist pitch J5 joint, and wrist roll J6 joint) are provided to improve the manipulability of the robotic arm. The axes of the wrist pitch J5 joint, the wrist roll J6 joint, and the forearm roll J4 joint are intersecting for reduced arm motion to reorient objects. The wrist roll J6 point is provided instead of two pitch joints in the wrist in order to improve object rotation.

In some examples, a robotic arm such as the one illustrated in FIG. 4 may be capable of operating in a teach mode. In particular, teach mode may be an operating mode of the robotic arm that allows a user to physically interact with and guide robotic arm towards carrying out and recording various movements. In a teaching mode, an external force is applied (e.g., by the user) to the robotic arm based on a teaching input that is intended to teach the robot regarding how to carry out a specific task. The robotic arm may thus obtain data regarding how to carry out the specific task based on instructions and guidance from the user. Such data may relate to a plurality of configurations of mechanical components, joint position data, velocity data, acceleration data, torque data, force data, and power data, among other possibilities.

During teach mode the user may grasp onto the EOAS or wrist in some examples or onto any part of robotic arm in other examples, and provide an external force by physically moving robotic arm. In particular, the user may guide the robotic arm towards grasping onto an object and then moving the object from a first location to a second location. As the user guides the robotic arm during teach mode, the robot may obtain and record data related to the movement such that the robotic arm may be configured to independently carry out the task at a future time during independent operation (e.g., when the robotic arm operates independently outside of teach mode). In some examples, external forces may also be applied by other entities in the physical workspace such as by other objects, machines, or robotic systems, among other possibilities.

III. Example Spine and Actuator

Figure 5:
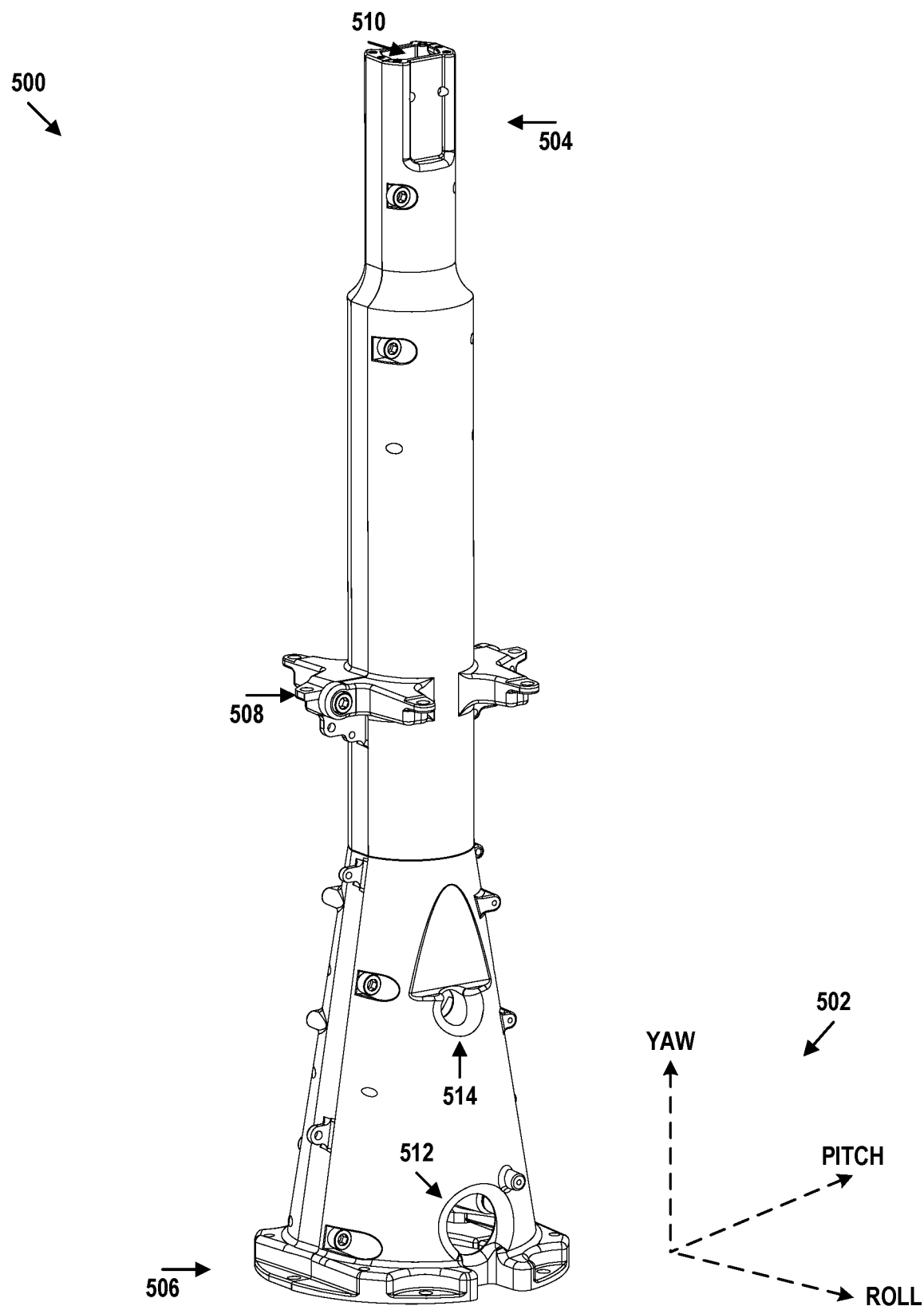
FIG. 5 illustrates a spine, in accordance with example embodiments.

FIG. 5 illustrates an example spine 500 that may be used as part of a structure of a robot or other device. Spine 500 includes first end (i.e., top end, as drawn) 504, second end (i.e., bottom end, as drawn) 506, and flange 508. Spine 500 may alternatively be referred to as a mounting column, a structural column, a spinal column, a brace, a post, a tower, or a mast, among other possibilities.

Spine 500 may be an approximately cylindrical structure having a height that is greater than its diameter, and including thereon a plurality of mechanical features for attaching components thereto. In some implementations, bottom end 506 of spine 500 may flare out or extend outwards to provide a wider stance (relative to other parts of spine 500) and larger area for attachment of spine 500 to an underlying base, foundation, or connection point. Such a bottom end may also provide added resistance against torsion and bending of spine 500 as various components are attached along and above spine 500.

In some implementations, spine 500 may be manufactured as two separate halves that, as shown, are symmetric about the yaw axis and/or about a plane containing the yaw and pitch axes of coordinate system 502. These two halves may subsequently be fixedly connected together (e.g., by way of screws, nuts and bolts, rivets, or other fasteners) to form spine 500. Alternatively, spine 500 may be manufactured as a single piece, or as three or more separate pieces that are subsequently assembled together.

In one example, spine 500 may be used as part of robot 200. Namely, base end 506 may be connected to mobile base 202, top end 504 may be connected to mast 210, and spine 500 may extend through midsection 204 (e.g., through the mounting column and the rotational joint for arm 206). Thus, spine 500 might not be visible from an exterior of robot 200. Spine 500 may nevertheless provide structural support to midsection 204, arm 206, mast 210, and perception housing 212, among other components. Further, as is discussed in more detail below, spine 500 may provide for independent yaw rotation of arm 206 and perception housing 212. In other applications, spine 500 may be used to support multiple arms and appendages rotationally coupled thereto and configured to rotate independently of one another.

Spine 500 may have a hollow core, and may include holes 510, 512, and 514 that provide access to the hollow core. The combination of the hollow core and holes 510, 512, and 514 may allow for routing of cables between structures attached at different portions along spine 500. For example, base end 506 may be connected to mobile base 202 which houses compute box 216. Signal and/or power cables may be routed, by way of hole 512 and the hollow core, from compute box 216 to robotic components positioned around hole 514. Similarly, signal and/or power cables may be routed, by way of hole 512 and the hollow core, from compute box 216 to robotic components positioned around and above hole 510.

Spine 500 may define a yaw axis that runs vertically along a centerline thereof, and is thus parallel to the yaw axis shown by coordinate system 502. Namely, the yaw axis defined by spine 500 may run along a line (e.g., geometric centerline of spine 500) between top end 504 and bottom end 506. Various robotic components may be rotatably and/or fixedly connectable to spine 500 at different points and/or sections thereon and along the yaw axis, such that these components rotate about the yaw axis defined by spine 500. As one example, flange 508 may be used for mounting thereto an actuator, such as that illustrated in FIGS. 6A and 6B.

Figure 6A:
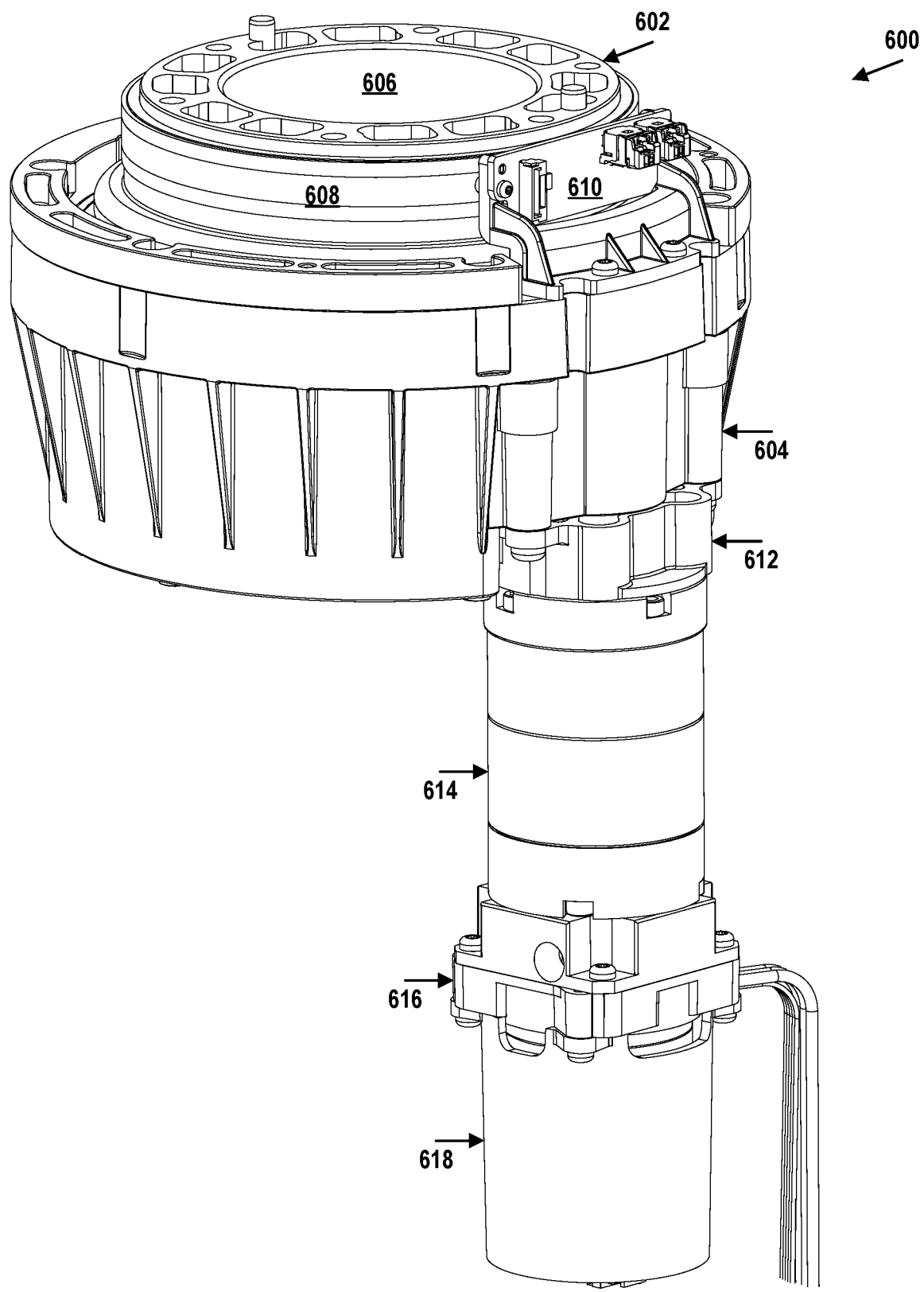
FIGS. 6A and 6B illustrate an actuator, in accordance with example embodiments.
Figure 6B:
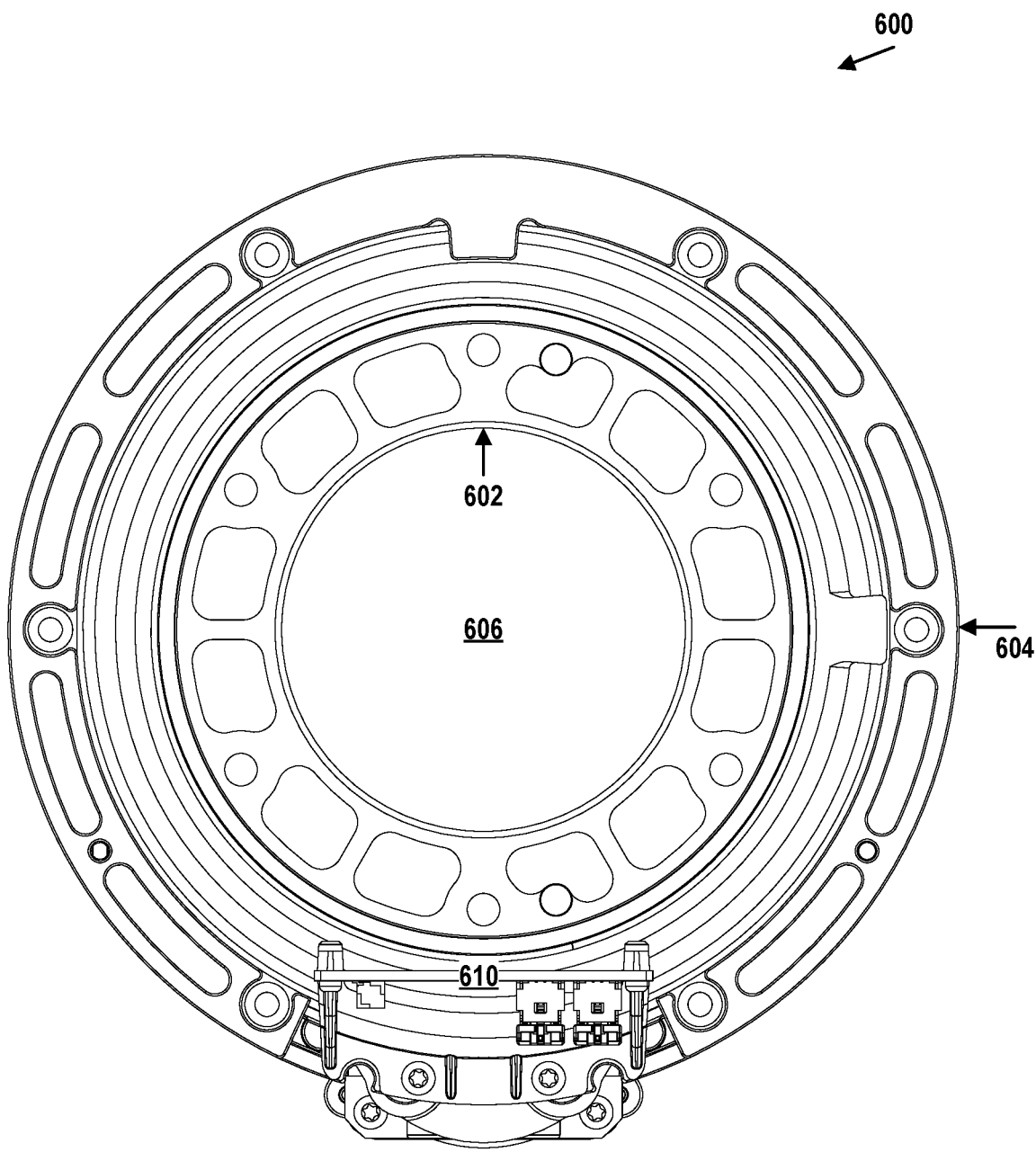

FIGS. 6A (side view) and 6B (top view) illustrate actuator 600 that may be mountable to a spine and used to cause rotation of a robotic component about the spine. Actuator 600 includes motor 618, gear train 614, and adapter 616 for connecting motor 618 to gear train 614. Actuator 600 also includes hub 602 disposed within and rotatably connected to housing 604. Housing 604 may surround hub 602 along a circumference thereof and these two components may be concentric to provide for the rotatable connection therebetween.

Housing 604 and hub 602 may each resemble a cylindrical annulus in general shape, with various mechanical structures defined thereon or connected thereto. Thus, hub 602 may define bore 606 sized to fit therethrough at least a portion of spine 500. Housing 604 may similarly define a second, larger bore sized to fit therein hub 602. Housing 604 and hub 602 may be collectively referred to as a ring or as a ring portion of actuator 600. Consequently, actuator 600 may, in some cases, be referred to as a ring actuator, an annular actuator, or a hollow-core actuator, among other possibilities.

Encoder ring 608 may be disposed around a portion of hub 602. Circuitry 610 configured to sense a rotational position of encoder ring 608 may be connected to housing 604 such that circuitry 610 is positioned adjacent to encoder ring 608. Encoder ring 608 may be, for example, a magnetic ring that defines a magnetic pattern sensed by magnetic field sensors in circuitry 610. Encoder ring 608 and circuitry 610 may alternatively utilize optical encoding, inductive encoding, capacitive encoding, or laser encoding, among other possibilities.

In some implementations, encoder ring 608 may include thereon three or more distinct circular tracks, each defining a corresponding magnetic sequence. These magnetic sequences may each have a different number of magnetic polarizations, and may thus be offset relative to one another. Namely, each pair of magnetic polarizations on two tracks may be offset relative to one another by a different physical distance as a result of the differing number of magnetic polarizations. Accordingly, circuitry 610 may be configured to determine the absolute position of encoder ring 608 based on the phase shift between signals generated by different pairs of the three or more tracks (e.g., using the Nonius principle).

Notably, two tracks may be insufficient to provide an angular resolution desired of encoder ring 608 given the size of bore 606 in some implementations. In an encoder ring with two tracks, a resolution of the encoder ring may be dictated by the number of magnetic poles on one of the tracks. In some cases, manufacturing limitations or limitations on the ability of circuitry 610 to determine phase shift may dictate a maximum number of magnetic poles on each track (e.g., due to minimum pole pitch). Thus, the maximum resolution provided by two tracks may be limited. By providing a third track, this maximum resolution may be doubled relative to a two-track encoder ring, thus allowing encoder ring 608 to provide a desired resolution while accommodating the size of bore 606 and spine 500.

Gear train 614 may be connected to housing 604 by way of annular plate 612. Annular plate 612 may be a component separate from housing 604 or, in other implementations, an integral subset of housing 604. Annular plate 612 may position an output gear of gear train 614 such that the output gear meshes with one or more gears connected to hub 602. Thus, by driving motor 618, rotation of motor 618 may be translated by way of gear train 614 into rotation of hub 602 relative to housing 604. Accordingly, by fixedly connecting housing 604 to spine 500 (e.g., by way of flange 508) and connecting hub 602 to a joint rotatably coupled to spine 500, actuator 600 may be used to rotate this joint about the yaw axis defined by spine 500.

IV. Example Spine and Actuator Assembly

Figure 7:
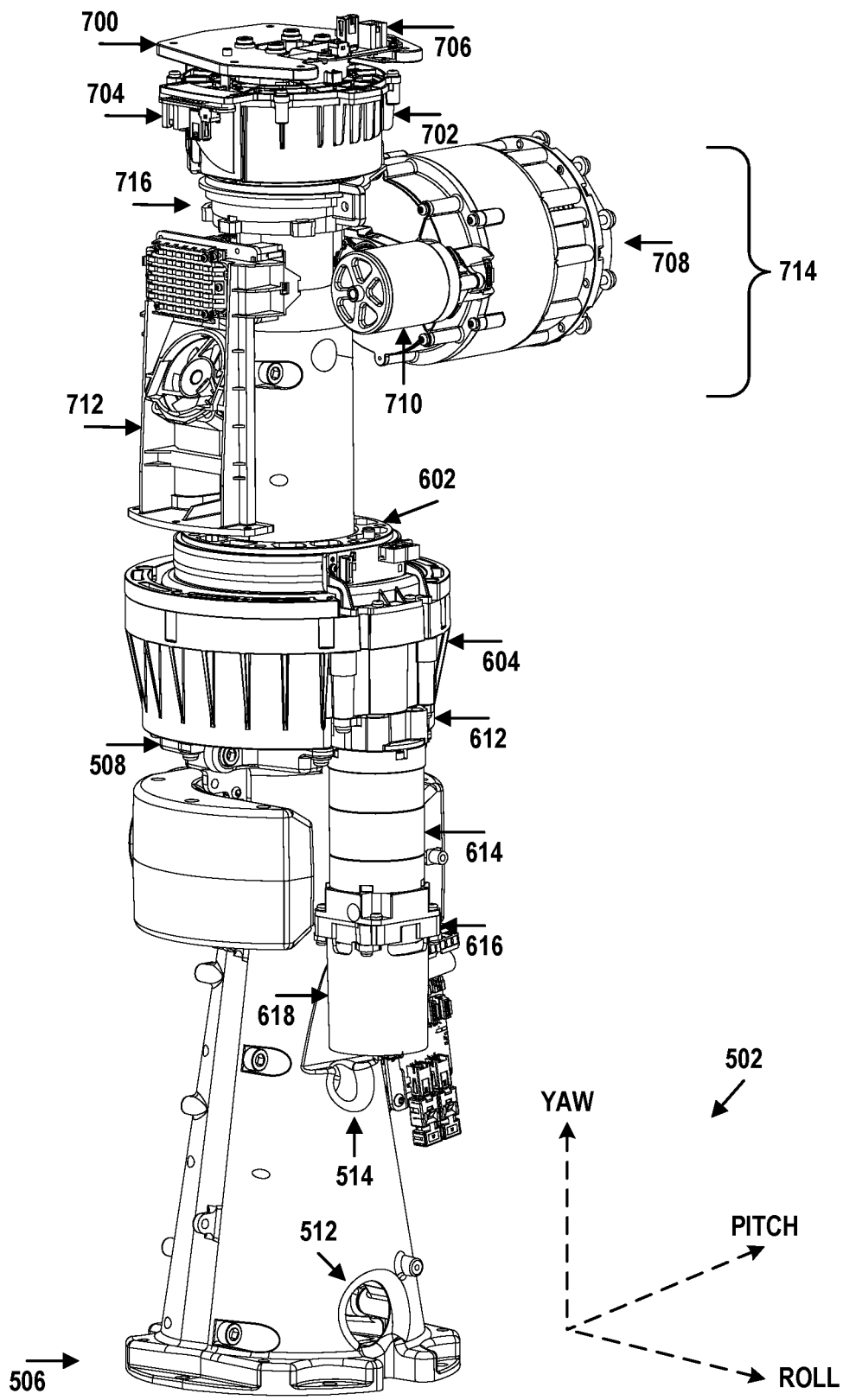
FIG. 7 illustrates an assembly of a spine and an actuator, in accordance with example embodiments.

FIG. 7 illustrates an assembly of spine 500 and actuator 600. A bottom portion of housing 604 of actuator 600 may be fixedly connected to flange 508 (e.g., at a first point along the yaw axis of spine 500), thus securing actuator 600 to spine 500. Spine 500 may extend through bore 606 in hub 602. Joint 714 may be rotatably connected to spine 500 above actuator 600 (e.g., at a second point along the yaw axis of spine 500), and may be fixedly connected to hub 602. Thus, when motor 618 is driven, rotation of motor 618 may cause rotation of hub 602 relative to housing 604, resulting in rotation of joint 714 about the yaw axis defined by spine 500.

The rotational axes of motor 618 and gear train 614 may be parallel to the yaw axis defined by spine 500, and may be offset therefrom so as to provide clearance between spine 500 and motor 618/gear train 614. Thus, motor 618 and gear train 614 may be connected to housing 604 closer to the circumference of housing 604 rather than the center thereof. Notably, by structuring actuator 600 in this way, the size of various components of the robot may be limited, allowing for a more compact robot design. For example, the assembly shown in FIG. 7 may fit inside of midsection 204 of robot 200 without necessitating any bulges or other changes to the cylindrical shape of the midsection to accommodate spine 500 and actuator 600.

Joint 714 may correspond to the shoulder yaw JO joint of the 7 DOF robotic arm shown in FIG. 4. Joint 714 may include at least a portion of shoulder 708. Shoulder 708 may be part of the structure of arm 206, and may be disposed between spine 500 and the shoulder pitch J1 joint. Joint 714 may also include bearing 716 that rotatably connects shoulder 708 to spine 500. Joint 714 may further include bracket 712 that retains shoulder 708 of the robotic arm about spine 500. Bracket 712 may be fixedly connected to hub 602 and shoulder 708 and may thus also be used to translate rotation of hub 602 into rotation of joint 714 about spine 500. In some implementations, bracket 712 may additionally provide structures to which various components of the robotic device may be mounted. For example, as illustrated in FIG. 7, bracket 712 may provide for mounting thereto a fan configured to provide cooling to the robot.

In some implementations, hub 602 and shoulder 708 may be fixedly connected together by additional brackets (not shown) that facilitate the transfer of rotational motion from hub 602 to joint 714. Similarly, spine 500 and shoulder 708 may be rotatably connected together using one or more additional bearings (not shown) disposed at other points on spine 500. Further, motor 710 may be provided to allow a portion of shoulder 708 to rotate about the pitch axis by way of the shoulder pitch J1 joint.

The assembly of FIG. 7 may also include clock spring 702 mounted to top end 504 of spine 500. Clock spring 702 may provide a rotational connection configured to transfer power and/or signals to joint 714 as this joint rotates. Thus, clock spring 702 may include input connectors 706 and output connectors 704 electrically connected to each other by way of wires wound around clock spring 702. As joint 714 is rotated in a first direction, clock spring 702 may be configured to allow the wires to be unwound by the force involved in this rotation. Similarly, as joint 714 is rotated in a second, opposite direction, clock spring 702 may be configured to wind the wires back in via a return spring force.

A set of cables running from hole 512 through the hollow core of spine 500 and exiting through hole 510 at top end 504 of spine 500 may be connected to input connectors 706. Components of joint 714 and robotic arm 206 may be connected to output connectors 704, which are electrically coupled to input connectors 706. Thus, clock spring 702 and spine 500 may allow for transfer of electrical power and/or signals from base end 506 of spine 500 to the robotic arm connected to joint 714 (e.g., robotic arm 206). A portion of this set of cables, or another additional set, may extend out of hole 510 and continue onto mast 210, perception housing 212, another appendage, and/or the components thereof.

Further, the assembly of FIG. 7 may also include adapter 700 mounted to top end 504 of spine 500. Adapter 700 may be connectable to another appendage of the robot. For example, adapter 700 may be connected directly to perception housing 212, connected to perception housing 212 by way of mast 210, and/or connected to another robotic arm instead of perception housing 212. Regardless of the specific structure of this appendage, the assembly of FIG. 7 may allow this appendage to rotate about the yaw axis of spine 500 independently of rotation of joint 714. Namely, adapter 700 may be fixedly connected to spine 500, which remains rotationally fixed as joint 714 rotates, thus allowing adapter 700 to serve as a fixed platform for mounting of the appendage.

Notably, the spine and actuator architecture illustrated in FIG. 7 allows different coaxial portions of a robot to rotate independently of one another about their respective rotational axes. This architecture may be contrasted with an alternative structure where stacked components are serially connected together such that, upon rotation of midsection 204 or a portion thereof (e.g., rotational joint for arm 206 that forms part of midsection 204), any structures located above midsection 204 are also rotated. That is, such alternative structure does not include a structural component, such as spine 500, which extends through multiple coaxial portions of the robot.

Thus, in the context of such an alternative structure, in order to keep perception housing 212 facing in a constant direction while shoulder yaw J0 joint of arm 206 is rotated, a rotational joint associated with the perception housing needs to be driven in a direction opposite to that of the shoulder yaw J0 joint 714. Such counter-control of perception housing 212 may necessitate additional hardware and computational complexity, and may also introduce noise into the robotic system as perception housing 212 is constantly adjusted relative to midsection 204. For example, as perception housing 212 is counter-controlled during rotation of the shoulder yaw J0 joint, perception housing 212 may move by small amounts rather than remaining still, thus repositioning and vibrating the sensors therein.

On the other hand, the spine and actuator architecture illustrated in FIG. 7 allows for independent control of multiple coaxial portions of the robot. Additionally, spine 500 provides a rigid structure to which such coaxial portions and components thereof may be securely mounted. Namely, when spine 500 is made out of metal, it may provide more stability and rigidity than other robotic components otherwise would, as these other components are likely to be made largely out of plastic.

V. Example Actuator Design

Figure 8A:
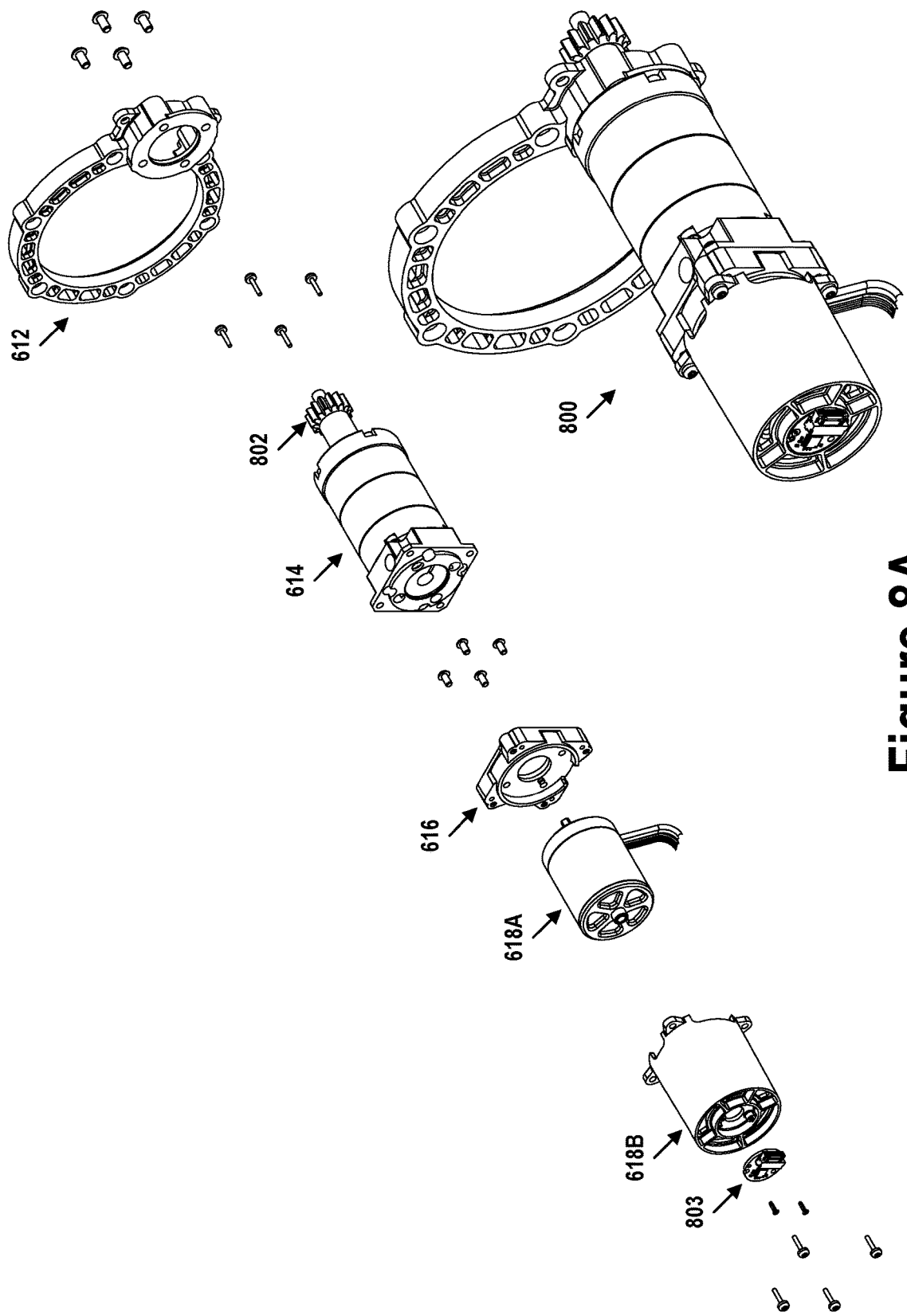
FIGS. 8A, 8B, and 8C illustrate exploded views of portions of an actuator, in accordance with example embodiments.
Figure 8B:
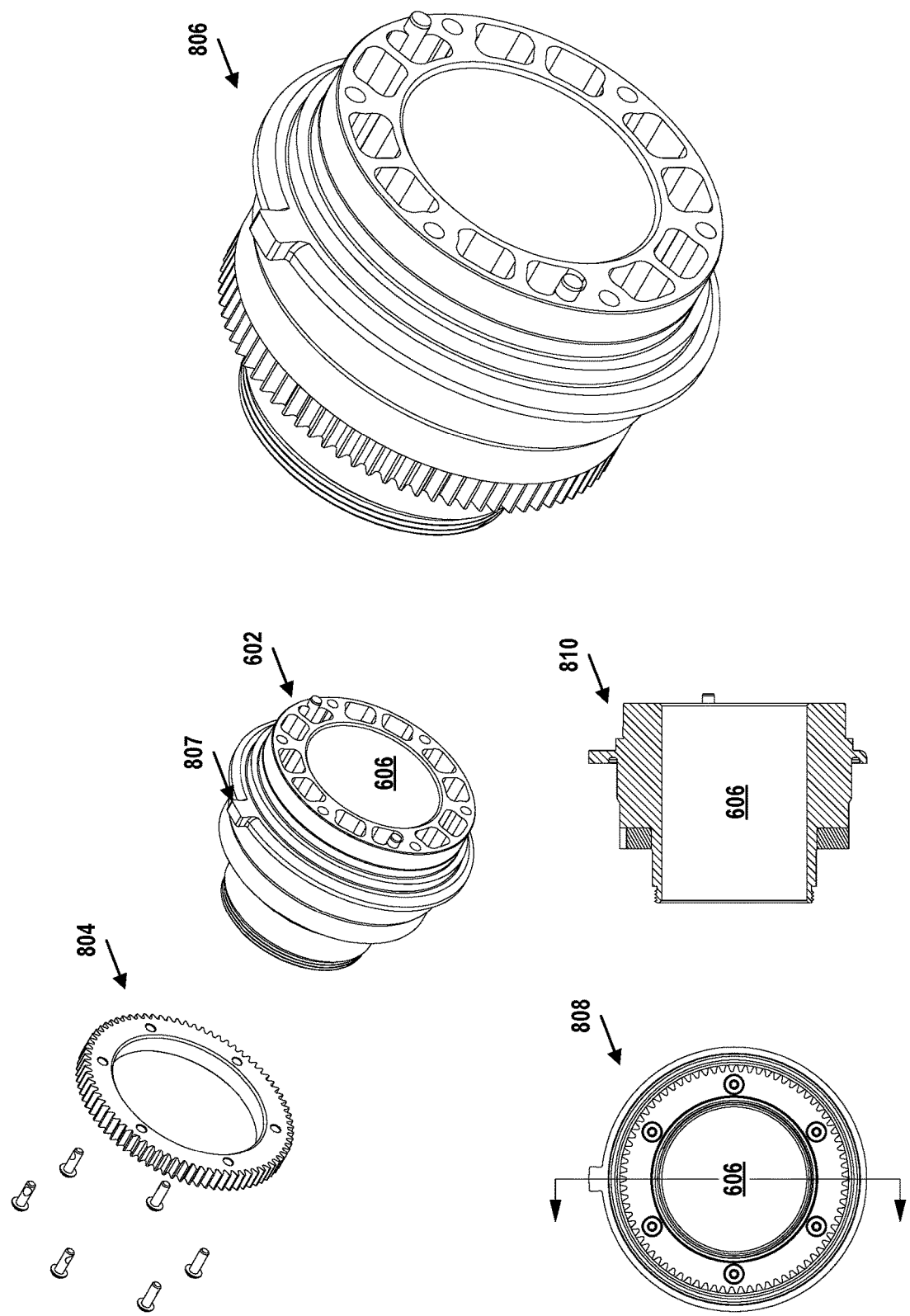
Figure 8C:
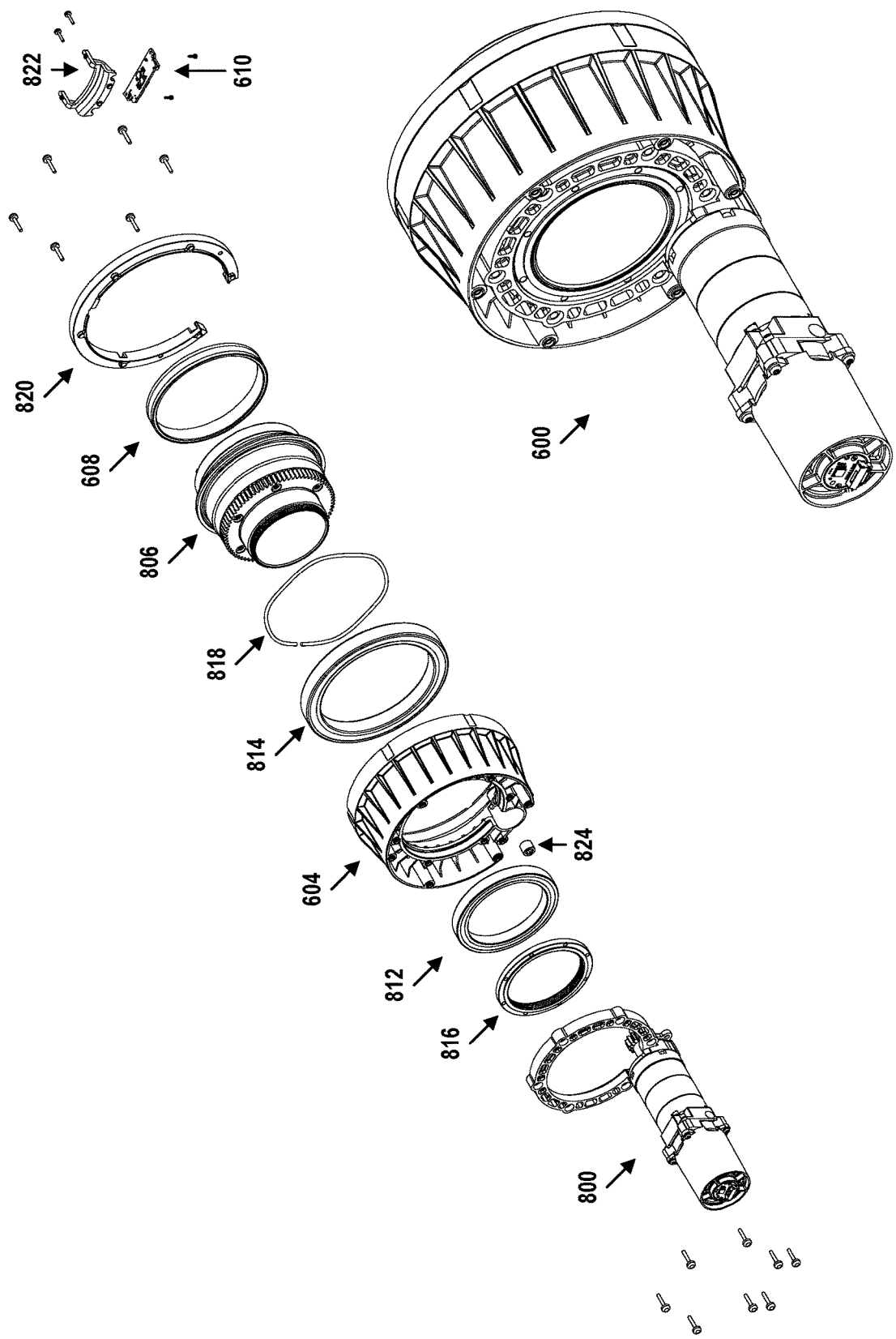

FIGS. 8A, 8B, and 8C illustrate exploded views of components of actuator 600. Namely, FIG. 8A illustrates an exploded view of motor assembly 800 of actuator 600. Motor assembly 800 may extend from motor 618 to annular plate 612. Motor 618 may include motor housing 618B, motor 618A, and motor position encoder 803. Motor position encoder 803 may be connected to motor housing 618B by way of screws or other fasteners. Motor housing 618B may be similarly connected to adapter 616, thus positioning a drive shaft of motor 618A to connect to gear train 614. Gear train 614 may be a planetary gear train, although other types of gear trains or transmissions are possible. Gear train 614 may include output gear 802, which may include a shaft portion extending beyond the toothed portion and configured to couple with a bearing (e.g., a needle bearing) inside of housing 604 to position output gear 802 relative thereto. Gear train 614 may be connected to annular plate 612 by way of screws or other fasteners. Gear train 614 and motor 618 may be stacked together to form a generally cylindrical structure.

FIG. 8B illustrates an exploded view of hub assembly 806 of actuator 600. Hub assembly 806 may include hub 602 and ring gear 804 fixedly disposed around a portion of hub 602. Ring gear 804 may be connected to hub 602 by way of screws, bolts, rivets, or other fasteners. In some implementation, ring gear 804 may be integral and co-molded with hub 602, rather than being a separate piece. Hub 602 may include thereon protrusion 807 that, in combination with housing 604, defines a hard-stop for rotation of hub 602 relative to housing 604. FIG. 8B also illustrates a top view 808 and a cross-sectional view 810 of hub assembly 806.

FIG. 8C illustrates an exploded view of actuator 600. Namely, FIG. 8C illustrates motor assembly 800 and hub assembly 806 along with other components used to combine these assemblies into actuator 600. Namely, hub assembly 806 may be rotatably connected to housing 604 by way of bearing 814, bearing 812, and nut 816. Washer 818 may be disposed between bearing 814 and hub assembly 806.

Hub 602 may include a first cylindrical section having a first outer diameter such that bearing 814 can be press-fit or otherwise affixed to hub 602, a second cylindrical section having a second outer diameter such that bearing 812 can be press-fit or otherwise affixed to hub 602, and a threaded cylindrical section such that nut 816 can be screwed thereonto to connect hub 602 to housing 604. Similarly, housing 604 may include a first bore section having a first inner diameter such that bearing 814 can be affixed to and within housing 604, a second bore section having a second inner diameter such that bearing 812 can be affixed to and within housing 604, and a third bore section having a third inner diameter smaller than an outer diameter of nut 816 such that nut 816 retains hub assembly 806 against housing 604.

Encoder ring 608 may be disposed around a top portion of hub assembly 806. Encoder circuitry 610 may be connected to housing 604 by way of bracket 822. Hard-stop bracket 820 may also be connected to housing 604 to, in combination with protrusion 807, define limits of rotation of hub assembly 806 with respect to housing 604.

Motor assembly may be connected to housing 604 by way of screws or other fasteners. The connection between motor assembly 800 and housing 604 may position output gear 802 such that it meshes with ring gear 804. Output gear 802 may be retained in a fixed linear position, but allowed to rotate, relative to housing 604 and hub 602 by way of needle bearing 824 disposed between a shaft portion extending past output gear 802 and a corresponding recess in housing 604.

VI. Additional Example Operations

Figure 9:
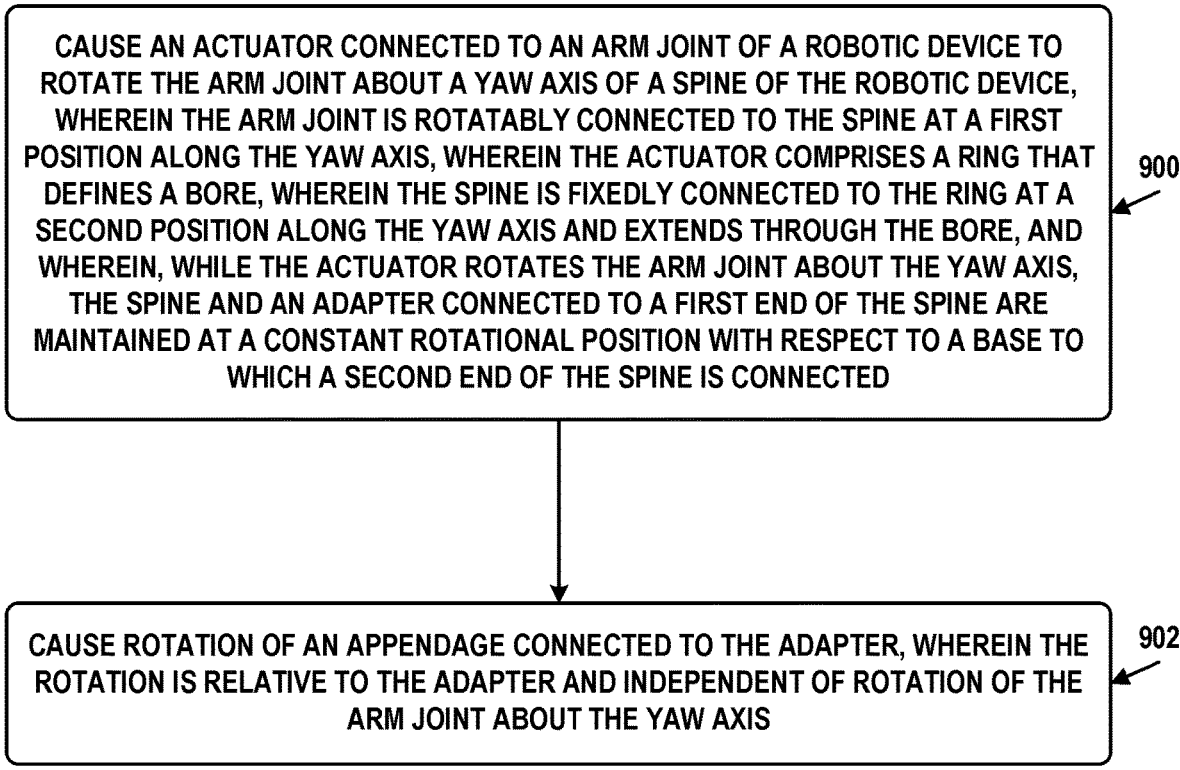
FIG. 9 illustrates a flow chart, in accordance with example embodiments.

FIG. 9 illustrates a flow chart of operations related to operating a robotic device. The operations may be carried out by robotic system 100 or robot 200, among other possibilities. The embodiments of FIG. 9 may be simplified by the removal of any one or more of the features shown therein. Further, these embodiments may be combined with features, aspects, and/or implementations of any of the previous figures or otherwise described herein.

Block 900 may involve causing an actuator connected to an arm joint of a robotic device to rotate the arm joint about a yaw axis of a spine of the robotic device. The arm joint may be rotatably connected to the spine at a first position along the yaw axis. The actuator may include a ring that defines a bore. The spine may be fixedly connected to the ring at a second position along the yaw axis and may extend through the bore. While the actuator rotates the arm joint about the yaw axis, the spine and an adapter connected to a first end of the spine may be maintained at a constant rotational position with respect to a base to which a second end of the spine is connected.

Block 902 may involve causing rotation of an appendage connected to the adapter. The rotation may be relative to the adapter and may be independent of rotation of the arm joint about the yaw axis.

In some embodiments, the appendage may include one or more of: (i) a perception housing connected directly to the adapter, (ii) a perception housing connected to the adapter by way of a mast, or (iii) a second arm joint connecting a second arm to the spine.

In some embodiments, the appendage may include a perception housing connected to the adapter by way of a mast fixedly connected to the adapter. The perception housing may be configured to pan and tilt relative to the adapter.

In some embodiments, the ring may include (i) a hub defining the bore and (ii) a housing concentric with and surrounding the hub. The hub may be rotatably coupled to the housing by way of one or more gears. The hub may be fixedly connected to the arm joint. The housing may be fixedly connected to the spine. The actuator may also include a motor and a gear train connecting the motor to the one or more gears.

In some embodiments, the gear train may be a planetary gear train having a first rotational axis. The planetary gear train and the motor may be positioned along the spine such that the first rotational axis and a second rotational axis of the motor are each parallel to the yaw axis of the spine.

In some embodiments, the one or more gears may include a ring gear disposed around a portion of the hub. The robotic device may also include an annular plate fixedly connecting the gear train to the housing such that an output gear of the gear train meshes with the ring gear to rotate the hub relative to the housing.

In some embodiments, an encoder ring may be fixedly connected to and disposed around a portion of the hub. A detector circuit may be connected to the housing and positioned adjacent to an outer circumference of the encoder ring. The detector circuit may be configured to determine a rotational position of the hub relative to the housing based on a pattern defined by the encoder ring.

In some embodiments, the encoder ring may include three or more magnetic tracks defined on an outer circumference of the encoder ring. Each respective track of the three or more magnetic tracks may include a corresponding different number of magnetic polarizations. The magnetic polarizations of each respective track may be rotationally offset relative to magnetic polarizations of other tracks of the three or more magnetic tracks to define the pattern such that the three or more magnetic tracks indicate an absolute rotational position of the hub relative to the housing.

In some embodiments, the spine may include a hollow core, a first hole at a first end of the spine, a second hole at a second end of the spine, and a third hole proximate the second position. The second hole may be connected to the third hole by way of the hollow core to provide for routing of a first set of wires from a base of the robotic device to the actuator. The second hole may be connected to the first hole by way of the hollow core to provide for routing of a second set of wires from the base of the robotic device to the arm joint.

In some embodiments, the robotic device may also include a base connected to a second end of the spine and a midsection disposed between the arm joint and the base and coaxial with the arm joint. The spine may extend through the midsection and the arm joint to provide structural support thereto.

In some embodiments, the robotic device may include a clock spring connected at a first end of the spine and electrically coupled to the arm joint by way of one or more wires. The clock spring may be configured to wind and unwind the one or more wires when the arm joint rotates about the yaw axis. The ring of the actuator may include a hard stop that defines rotational limits for the arm joint based on the clock spring.

In some embodiments, the spine may include two halves symmetric about the yaw axis.

In some embodiments, the robotic device may include an arm having seven degrees of freedom and connected to the spine by way of the arm joint. The arm joint may provide a first degree of freedom of the seven degrees of freedom.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A robotic device comprising:
    a spine defining a yaw axis;
    an arm joint rotatably connected to the spine at a first position along the yaw axis and configured to rotate about the yaw axis; and
    an actuator comprising:
        a motor;
        a gear train connecting the motor to an output gear;
        a hub defining a bore, comprising one or more gears, and fixedly connected to the arm joint, wherein the spine extends through the bore;
        a housing concentric with, rotatably coupled to, and surrounding the hub, wherein the housing is fixedly and non-rotatably connected to the spine at a second position along the yaw axis; and
        an annular plate fixedly and non-rotatably connected to the housing and connecting the gear train to the housing such that the output gear meshes with the one or more gears of the hub to rotate the arm joint about the yaw axis without rotating the spine.

2. The robotic device of claim 1, further comprising:
    an appendage; and
    an adapter connected to (i) the appendage and (ii) a first end of the spine such that the adapter remains stationary when the arm joint rotates about the yaw axis, wherein the appendage is configured to rotate relative to the adapter independently of rotation of the arm joint about the yaw axis.

3. The robotic device of claim 2, wherein the appendage comprises a perception housing connected to the adapter by way of a mast fixedly connected to the adapter, wherein the perception housing is configured to pan and tilt relative to the adapter.

4. The robotic device of claim 2, wherein the appendage comprises one or more of: (i) a perception housing connected directly to the adapter, (ii) a perception housing connected to the adapter by way of a mast, or (iii) a second arm joint connecting a second arm to the spine.

5. The robotic device of claim 1, wherein the gear train is a planetary gear train having a first rotational axis, and wherein the planetary gear train and the motor are positioned along the spine such that the first rotational axis and a second rotational axis of the motor are each parallel to the yaw axis of the spine.

6. The robotic device of claim 1, wherein the one or more gears comprise a ring gear disposed around a portion of the hub.

7. The robotic device of claim 1, further comprising:
    an encoder ring fixedly connected to and disposed around a portion of the hub; and
    a detector circuit connected to the housing and positioned adjacent to an outer circumference of the encoder ring, wherein the detector circuit is configured to determine a rotational position of the hub relative to the housing based on a pattern defined by the encoder ring.

8. The robotic device of claim 7, wherein the encoder ring comprises three or more magnetic tracks defined on an outer circumference of the encoder ring, wherein each respective track of the three or more magnetic tracks comprises a corresponding different number of magnetic polarizations, wherein the magnetic polarizations of each respective track are rotationally offset relative to magnetic polarizations of other tracks of the three or more magnetic tracks to define the pattern such that the three or more magnetic tracks indicate an absolute rotational position of the hub relative to the housing.

9. The robotic device of claim 1, wherein the spine comprises a hollow core, a first hole at a first end of the spine, a second hole at a second end of the spine, and a third hole proximate the second position, wherein the second hole is connected to the third hole by way of the hollow core to provide for routing of a first set of wires from a base of the robotic device to the actuator, and wherein the second hole is connected to the first hole by way of the hollow core to provide for routing of a second set of wires from the base of the robotic device to the arm joint.

10. The robotic device of claim 1, further comprising:
a base connected to a second end of the spine; and
a midsection disposed between the arm joint and the base and coaxial with the arm joint, wherein the spine extends through the midsection and the arm joint to provide structural support thereto.

11. The robotic device of claim 1, further comprising:
a clock spring connected at a first end of the spine and electrically coupled to the arm joint by way of one or more wires, wherein the clock spring is configured to wind and unwind the one or more wires when the arm joint rotates about the yaw axis, and wherein the hub and the housing comprise a hard stop that defines rotational limits for the arm joint based on the clock spring.

12. The robotic device of claim 1, wherein the spine comprises two halves symmetric about the yaw axis.

13. The robotic device of claim 1, further comprising:
an arm having seven degrees of freedom and connected to the spine by way of the arm joint, wherein the arm joint provides a first degree of freedom of the seven degrees of freedom.

14. An actuator comprising:
a motor;
a gear train connecting the motor to an output gear;
a hub defining a bore and comprising a ring gear disposed around a portion thereof, wherein the hub is fixedly connectable to a joint, and wherein the bore provides clearance for extension therethrough of a spine having a yaw axis around which the joint is configured to rotate;
a housing concentric with, rotatably coupled to, and surrounding the hub, wherein the housing is fixedly and non-rotatably connectable to the spine; and
an annular plate fixedly and non-rotatably connected to the housing and connecting the gear train to the housing such that the output gear meshes with the ring gear to rotate the hub relative to the housing.

15. The actuator of claim 14, wherein the gear train is a planetary gear train having a first rotational axis, and wherein the planetary gear train and the motor are positionable along the spine such that the first rotational axis and a second rotational axis of the motor are each parallel to the yaw axis of the spine.

16. The actuator of claim 14, further comprising:
an encoder ring fixedly connected to and disposed around a second portion of the hub; and
a detector circuit connected to the housing and positioned adjacent to an outer circumference of the encoder ring, wherein the detector circuit is configured to determine a rotational position of the hub relative to the housing based on a pattern defined by the encoder ring.

17. The actuator of claim 16, wherein the encoder ring comprises three or more magnetic tracks defined on an outer circumference of the encoder ring, wherein each respective track of the three or more magnetic tracks comprises a corresponding different number of magnetic polarizations, wherein the magnetic polarizations of each respective track are rotationally offset relative to magnetic polarizations of other tracks of the three or more magnetic tracks to define the pattern such that the three or more magnetic tracks indicate an absolute rotational position of the hub relative to the housing.

18. A method comprising:
causing an actuator connected to an arm joint of a robotic device to rotate the arm joint about a yaw axis of a spine of the robotic device, wherein the arm joint is rotatably connected to the spine at a first position along the yaw axis, wherein the actuator comprises (i) a motor, (ii) a gear train connecting the motor to an output gear, (iii) a hub defining a bore, comprising one or more gears, and fixedly connected to the arm joint, (iv) a housing concentric with, rotatably coupled to, and surrounding the hub, and (v) an annular plate fixedly and non-rotatably connected to the housing and connecting the gear train to the housing such that the output gear meshes with the one or more gears of the hub to rotate the arm joint about the yaw axis wherein the spine is fixedly and non-rotatably connected to the housing at a second position along the yaw axis and extends through the bore, and wherein, while the actuator rotates the arm joint about the yaw axis, the spine is maintained at a constant rotational position with respect to a base to which a first end of the spine is connected.

19. The method of claim 18, wherein an encoder ring is fixedly connected to the hub, the method further comprising:
determining, by way of a detector circuit connected to the housing and positioned adjacent to an outer circumference of the encoder ring, a rotational position of the hub relative to the housing based on a pattern defined by the encoder ring.

20. The method of claim 18, further comprising:
causing rotation of an appendage connected to an adapter that is connected to a second end of the spine, wherein the rotation of the appendage is relative to the adapter and independent of rotation of the arm joint about the yaw axis, and wherein the adapter is maintained at a constant rotational position with respect to the base while the actuator rotates the arm joint about the yaw axis.

* * * * *